(12) United States Patent
McLaughlin et al.

(10) Patent No.: US 7,630,599 B2
(45) Date of Patent: Dec. 8, 2009

(54) WAVELENGTH DISPERSIVE DEVICE WITH TEMPERATURE COMPENSATION

(75) Inventors: Sheldon McLaughlin, Ottawa (CA); Chester Murley, Ottawa (CA)

(73) Assignee: JDS Uniphase Corporation, Milpitas, CA (US)

(*) Notice: Subject to any disclaimer, the term of this patent is extended or adjusted under 35 U.S.C. 154(b) by 0 days.

(21) Appl. No.: 12/333,800

(22) Filed: Dec. 12, 2008

(65) Prior Publication Data
US 2009/0154876 A1    Jun. 18, 2009

Related U.S. Application Data

(60) Provisional application No. 61/006,011, filed on Dec. 14, 2007.

(51) Int. Cl.
*G02B 6/26* (2006.01)
*G02B 6/28* (2006.01)

(52) U.S. Cl. .................. 385/18; 385/24; 385/37

(58) Field of Classification Search ............ 385/14–19, 385/24, 37, 98, 141
See application file for complete search history.

(56) References Cited

U.S. PATENT DOCUMENTS

| 6,097,859 | A | 8/2000 | Solgaard et al. ............... 385/17 |
| 6,498,872 | B2 | 12/2002 | Bouevitch et al. .............. 385/24 |
| 6,707,959 | B2 | 3/2004 | Ducellier et al. .............. 385/17 |
| 6,735,358 | B2 * | 5/2004 | Kitoh et al. .................... 385/24 |
| 6,810,169 | B2 | 10/2004 | Bouevitch ..................... 385/24 |
| 7,014,326 | B2 | 3/2006 | Danagher et al. ........... 359/615 |
| 7,212,705 | B2 * | 5/2007 | Shahar et ...................... 385/24 |
| 2007/0242953 | A1 | 10/2007 | Keyworth et al. ............. 398/48 |

* cited by examiner

*Primary Examiner*—Akm Enayet Ullah
(74) *Attorney, Agent, or Firm*—Teitelbaum & MacLean; Neil Teitelbaum; Doug MacLean

(57) ABSTRACT

The invention relates to fiber-optic wavelength dispersive devices incorporating a wavelength dispersive reflector that provides auto-compensation of variations of output spectral characteristic with temperature and includes a transmissive dispersion that is followed by a beam-folding reflecting surface in a double-pass configuration grating and is coupled to a wedged shaped prism.

18 Claims, 14 Drawing Sheets

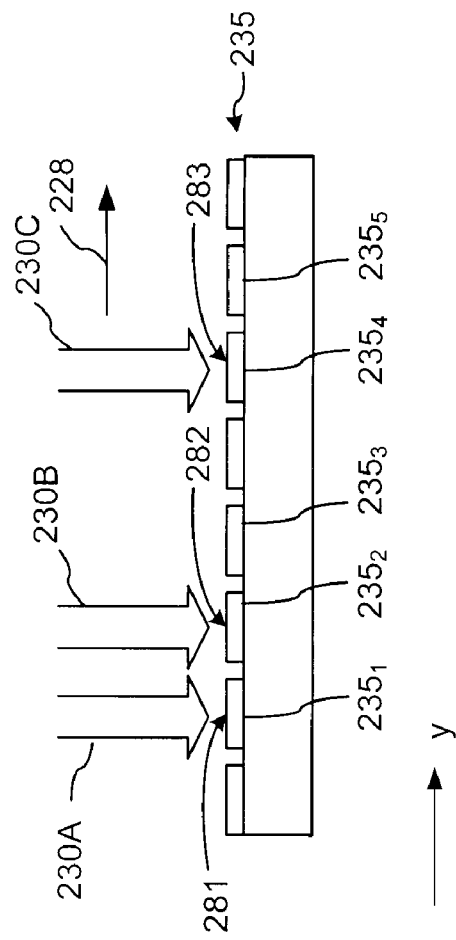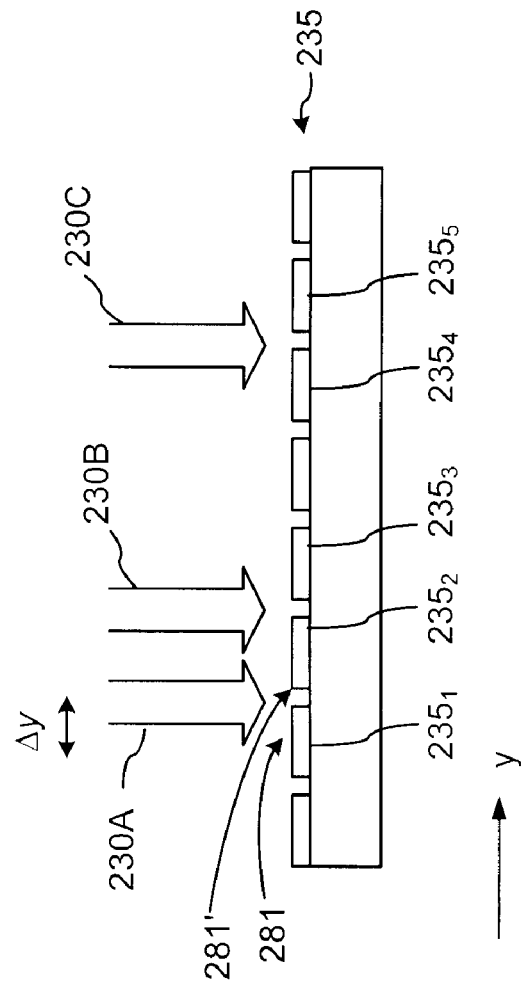

WAVELENGTH DISPERSIVE DEVICE WITH TEMPERATURE COMPENSATION

CROSS-REFERENCE TO RELATED APPLICATIONS

The present invention claims priority from U.S. Provisional Patent Application No. 61/006,011 filed Dec. 14, 2007, entitled "Dispersive subsystem producing a pre-determined non-zero shift in diffracted angle with temperature", which is incorporated herein by reference.

TECHNICAL FIELD

The present invention relates to optical dispersive devices incorporating diffraction gratings, and in particular to compensation of temperature-related shifts in such devices.

BACKGROUND OF THE INVENTION

Optical wavelength dispersive devices (WDD) often use diffraction gratings to spatially disperse different wavelength of incoming light and direct them along differing optical paths. Such grating-based WDD typically also includes an input aperture to launch light into the device, and collimating or focusing optical elements having optical power such as lenses and curved mirrors to form spectrally dispersed images on a focal surface.

One common embodiment of a WDD is a spectrograph, wherein a plurality of detector elements are disposed at the focal surface for measuring the intensity of the spectral components of the incoming light beam. Another important embodiment of a WDD is a wavelength selective switch (WSS), wherein an optical fiber is disposed at the input aperture, a plurality of controllable switching elements such as micro-electro-mechanical (MEMS) micro-mirrors are disposed at the focal surface, and the switching elements are effective in redirecting spectral components of the input optical signal back into a selected output optical fiber. Examples of such devices are disclosed in U.S. Pat. No. 6,097,859 issued Aug. 1, 2000 to Solgaard et al; U.S. Pat. No. 6,498,872 issued Dec. 24, 2002 to Bouevitch et al; U.S. Pat. No. 6,707,959 issued Mar. 16, 2004 to Ducellier et al; U.S. Pat. No. 6,810,169 issued Oct. 26, 2004 to Bouevitch, and U.S. Pat. Publication No. 2007/0242953 published Oct. 18, 2007 to Keyworth et al, which are incorporated herein by reference.

Another example of a WDD is a wavelength blocker (WB), or a dynamic gain equalizer (DGE). In these devices, dispersed images corresponding to de-multiplexed wavelength channels may be formed upon an array of liquid crystal cells, which independently rotate the state of polarization of the wavelength channels to either partially attenuate or completely block selected channels from passing back through the polarization diversity unit in the front end. Examples of WB and DGE backend units are disclosed in U.S. Pat. No. 7,014,326 issued Mar. 21, 2006 to Danagher et al; U.S. Pat. No. 6,498,872 issued Dec. 24, 2002 to Bouevitch et al; and U.S. Pat. No. 6,810,169 issued Oct. 26, 2004 to Bouevitch, which are incorporated herein by reference.

Another example of a WDD is a fiber optic multiplexer/demultiplexer, where an optical fiber is disposed at the input aperture, and a plurality of output optical fibers are disposed at the dispersed focal plane to receive the dispersed spectral components.

FIG. 1 illustrates a top view of a typical platform 100 for a WDD in which a spherical reflector 120 receives a beam of light from a front-end unit 122. The spherical reflector 120 reflects the beam of light to a diffraction grating 124, which disperses the beam of light into its constituent wavelength channels. The wavelength channels are again redirected by the spherical mirror 120 to a backend unit 126.

In the case of a WB or a DGE the front end unit 122 can include a single input/output port with a circulator, which separates incoming from outgoing signals, or one input port with one output port. Typically the front end unit 122 will include a polarization diversity unit for ensuring the beam (or sub-beams) of light has a single state of polarization. The backend unit 126 for a WB or a DGE includes an array of liquid crystal cells, which independently rotate the state of polarization of the wavelength channels to either partially attenuate or completely block selected channels from passing back through the polarization diversity unit in the front end 122.

In the case of a wavelength selective switch (WSS) the front end unit 122 is illustrated in FIG. 2 and includes an array 132 of input/output fibers 132A to 132D, each of which may have a corresponding lens 134A to 134D, respectively, forming a lens array 134. An angle to offset, or switching, lens 136 converts the lateral offset of the input fibers 132A to 132D into an angular offset at a point 138, which is imaged by the spherical lens 120 onto the backend unit 126. The lens array 134 can be removed depending on the relative positions of the switching lens 136. The backend unit 126 in a WSS is typically a MEMS array of tilting mirrors which can be used to steer each of the demultiplexed beams to one of several positions corresponding to a desired output port. The angle introduced at the back end unit 126 is then transformed by the angle to offset lens 136 to a lateral offset corresponding to the desired input/output fiber 132A to 132D. Alternatively, a liquid crystal phased array (LC or LCoS, if incorporated on a silicon driver substrate) can be used to redirect the light.

In operation as a WSS, a multiplexed beam of light is launched into the front-end unit 122 and optionally passes through the polarization diversity unit formed of a polarization beam splitter and a waveplate to provide two beams of light having the same state of polarization. The two beams of light are transmitted to the spherical reflector 120 and are reflected therefrom towards the diffraction grating 124. The diffraction grating 124 separates each of the two beams into a plurality of channel sub-beams of light having different central wavelengths. The plurality of channel sub-beams are transmitted to the spherical reflector 120, which redirects them to the MEMS or LC phased array 126, where they are incident thereon as spatially separated spots corresponding to individual spectral channels.

Each channel sub-beam can be reflected backwards along the same path or a different path, which extends into or out of the page in FIG. 1 to the array of fibers 132, which would extend into the page. Alternatively, each channel sub-beam can be reflected backwards along the same path or a different path, which extends in the plane of the page of FIG. 1. The sub-beams of light are transmitted, from the MEMS or LC phased array 126, back to the spherical reflector 120 and are redirected to the diffraction grating 124, where they are recombined and transmitted back to the spherical reflector 120 to be transmitted to a predetermined input/output port shown in FIG. 2.

In all such devices it is often desirable to have the positions of the spectrally dispersed images on the focal surface remain fixed as the temperature of the device is varied. However, as the temperature of the optical system of the WDD changes, the optical beam path through the WDD may vary, resulting in shifts of the dispersed images at the focal surface. In principle, it should be possible to choose optical materials and design mechanical support structures to make the positions of the spectrally dispersed images on the focal surface invariant over temperature. In practice however, this is often difficult or impossible, as materials with required thermal characteristics may not exist, or may have other properties or costs which make them impractical. Furthermore, modifying the design of the imaging optics to achieve temperature invariance may compromise the imaging properties of the optical system.

It is therefore an object of the present invention to provide means that would compensate for the temperature dependence of the optical system of a WDD without significantly complicating its optical design or significantly increasing its cost.

It is another object of the present invention to provide a WDD having a dispersive subsystem which produces a pre-determined non-zero shift in diffracted angle over temperature for passive compensation of temperature-induced variations in the device performance.

SUMMARY OF THE INVENTION

In accordance with the invention, there is provided a fiber optic wavelength dispersive device comprising: a front-end unit comprising a first port for launching an input optical signal; a wavelength dispersive reflector for receiving the input optical signal, for dispersing the input optical signal into a plurality of sub-beams of light with different central wavelengths, and for directing said sub-beams back at first angles along first optical paths in a dispersion plane; a spherical reflector for redirecting the input optical signal launched from the first port to the wavelength dispersive reflector, and for redirecting the sub-beams from the wavelength dispersive reflector back along second spatially separated optical paths; and, an array of beam receiving elements for receiving each of the sub-beams at a different location along the array according to the central wavelength thereof.

According to one aspect of the invention, the wavelength dispersive reflector comprises a transmissive dispersion grating (TDG) for receiving the input optical signal and for transmitting each of the plurality of sub-beams of light therethrough at a different angle of diffraction, a reflective surface spaced from the TDG for reflecting the plurality of sub-beams of light back through the transmissive dispersion grating for diffracting thereon, and a first wedged prism of an optically transparent material for refracting each of the sub-beams of light in the dispersion plane at an angle of refraction dependent on the temperature of the device, the first wedged prism having an apex angle, wherein a shift in the angles of refraction of the sub-beams provided by the first wedged prism due to a change in the temperature of the device at least partially compensates for a shift in the angles of diffraction caused by the change in the temperature of the device.

According to one aspect of the invention, the apex angle of the first wedged prism is such that the first wedged prism is effective to cause the first angles to vary with the temperature of the housing at a rate of at least 1 μrad/C so as to counteract temperature-induced variations of the second optical paths that occur outside of the wavelength dispersive reflector.

According to one aspect of the invention, the first wedged prism has a first surface facing the diffraction grating and a second surface defining the apex angle with the first surface, and wherein the first wedged prism is oriented with an apex side thereof away from the TDG.

BRIEF DESCRIPTION OF THE DRAWINGS

The invention will be described in greater detail with reference to the accompanying drawings which represent preferred embodiments thereof, in which like elements are indicated with like reference numerals, and wherein:

FIGS. 4A and 4B are schematic representations of an array of beam receiving elements shown in FIG. 3, illustrating temperature-induced lateral shifts of channel sub-beams along the array;

DETAILED DESCRIPTION

Figure 3:
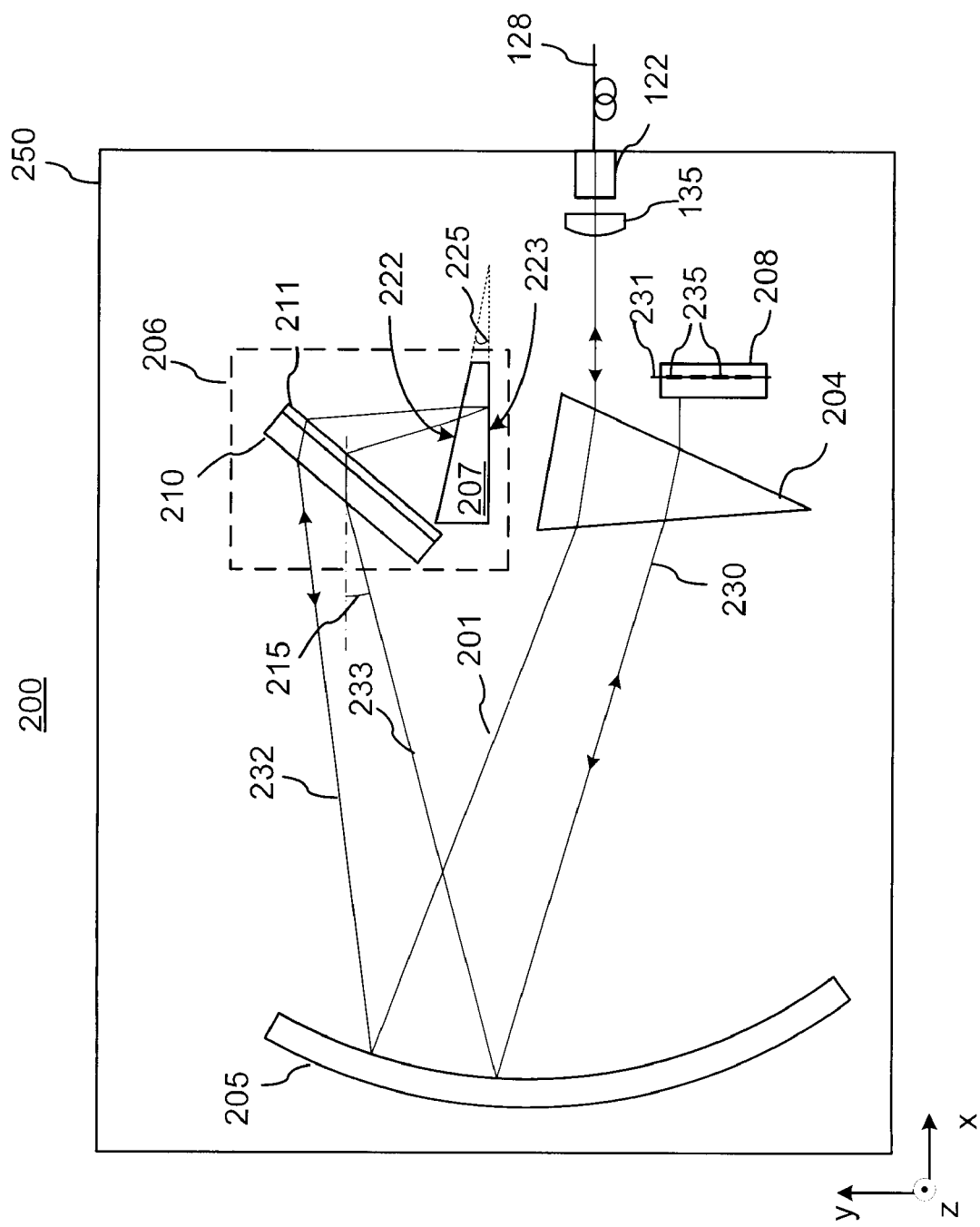
FIG. 3 is a schematic top view of a WDD incorporating a wavelength dispersive reflector (WDR) according to a first embodiment of the present invention.
Figure 9:
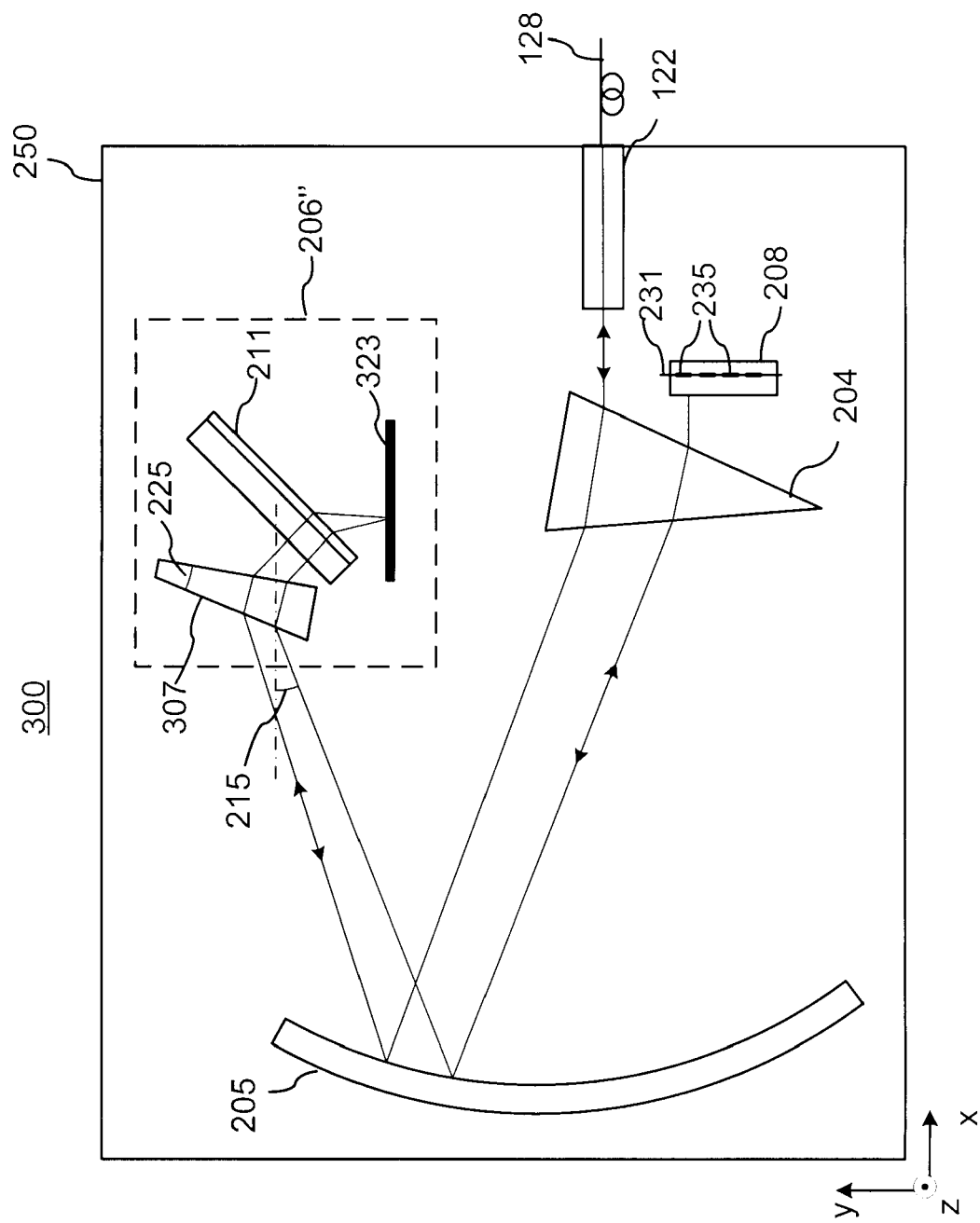
FIG. 9 is a schematic top view of a WDD incorporating a WDR according to a second embodiment of the present invention.
Figure 13:
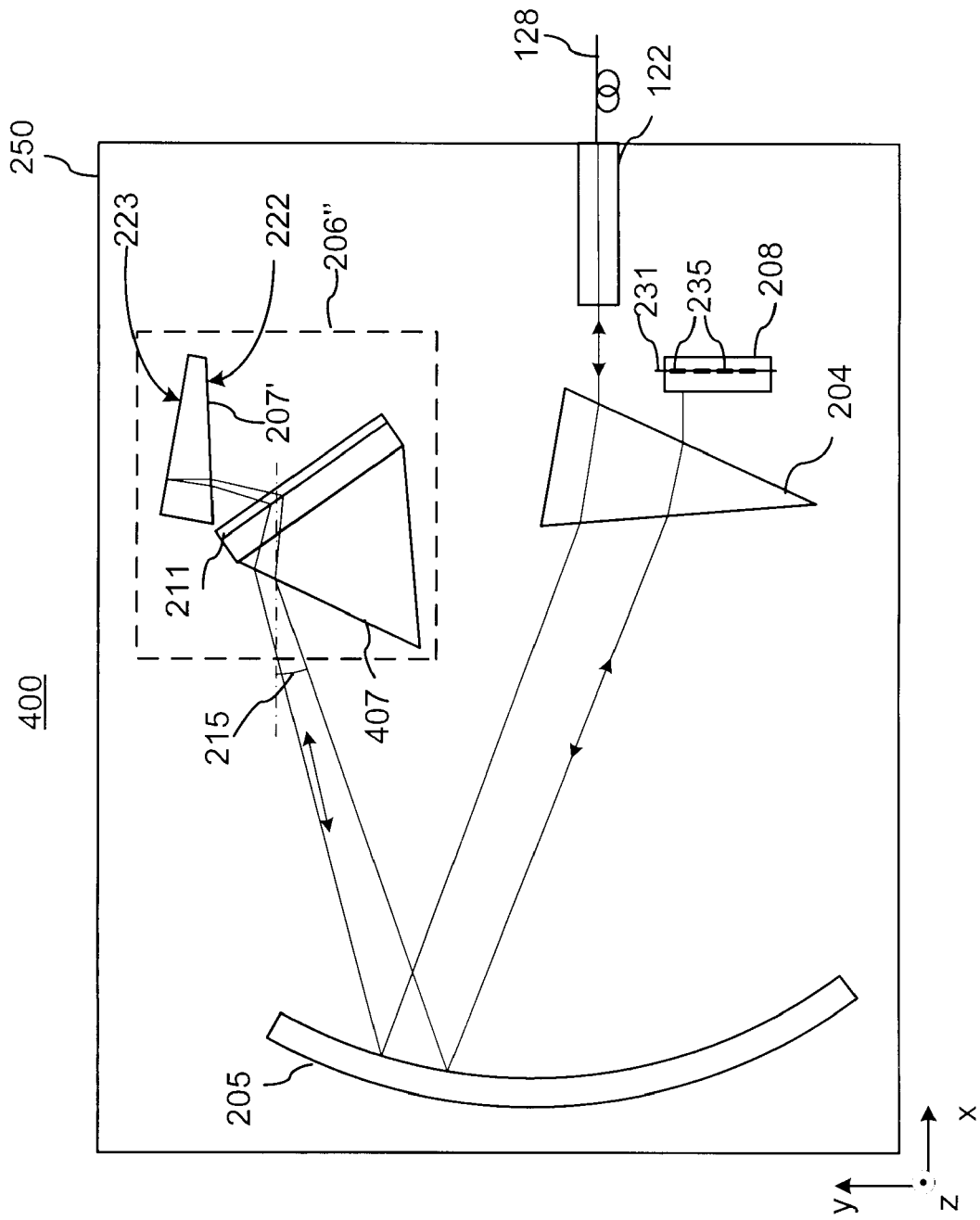
FIG. 13 is a schematic top view of a WDD incorporating a WDR according to a third embodiment of the present invention.

Embodiments of the invention are illustrated in FIGS. 3, 9, and 13, with selected constituent elements and sub-systems shown in FIGS. 4-7, and 11 in various embodiments thereof. In all these figures, like reference labels are used to identify like elements. In some figures, axes of a same Cartesian coordinate system (x,y,z) may be shown to illustrate spatial relationships between views represented in different figures.

Figure 1:
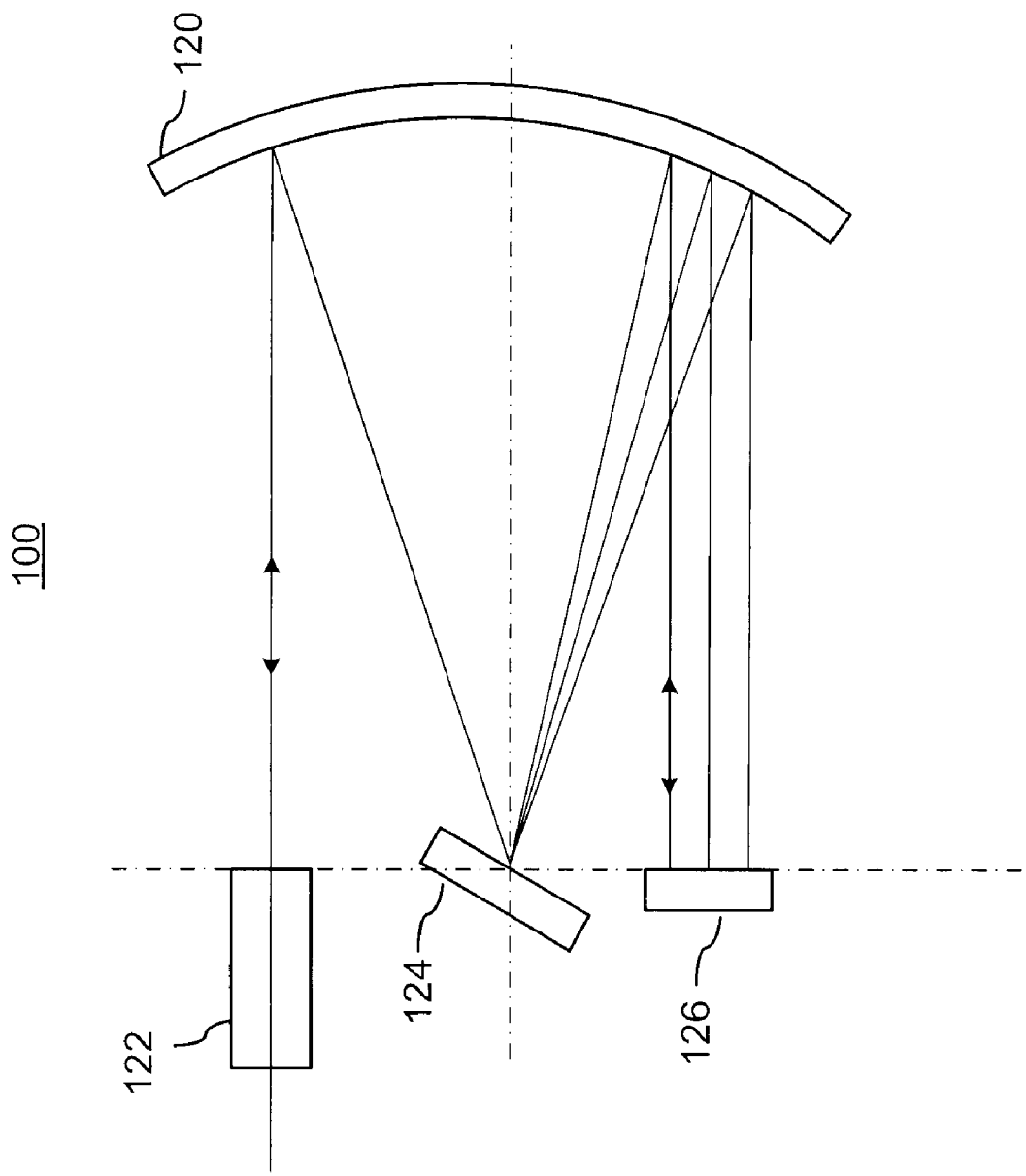
FIG. 1 is a schematic top view of a prior art fiber optic wavelength dispersive device (WDD)

FIG. 3 illustrates an improved wavelength dispersive device (WDD) 200 incorporating elements of the present invention, which in its different embodiments may operate as a WSS, a DGE, a WB, or a spectrometer. The WDD 200 is generally based on a WDD platform 100 that is illustrated in FIG. 1 and described in U.S. Pat. No. 6,707,959 to Ducellier et al, which is assigned to the assignee of the instant application and is incorporated herein by reference.

The WDD 200 includes a light redirecting element having optical power in the form of a concave, for example spherical, reflector 205, which receives a beam of light from a front-end unit 122 followed by an optional beam-shaping lens 135, and reflects it to a wavelength dispersive reflector (WDR) subsystem 206, which will be referred to hereinafter as the WDR 206. The WDR 206 disperses the beam of light incident thereupon into its constituent wavelength channels in a dispersion plane it defines, and reflects or directs them in the form of channel sub-beams back towards the spherical mirror 205, with each channel sub-beam having a different central wavelength. The channel sub-beams are reflected from the WDR 206 at first angles 215 along first optical paths 233, of which only one is shown in FIG. 3 for clarity, and which lie in the dispersion plane that is generally parallel to the plane of FIG. 3. The first angles 215, which depend on the sub-beam central wavelength, are also referred to herein as the output (sub-beam) angles of the WDR. The channel sub-beams are then redirected by the spherical mirror 205 to a back-end unit 208, which includes an array of beam receiving elements 235, also referred to herein generally as the array 235, wherein each of the sub-beams is received at a different location along the array 235 according to the central wavelength of the respective sub-beam.

In FIG. 3, the optical path of the input optical signal from the front-end unit 122 to the spherical reflector 205 is indicated by a reference label 201, the optical path of the input optical signal from the spherical reflector 205 to the WDR 206 is indicated by a reference label 232, the first optical paths of the channel sub-beams from the WDR 206 to the spherical reflector 205 are indicated by a reference label 233, and the second optical paths of the channel sub-beams from the spherical reflector 205 to the array of beam receiving elements 235 are indicated by a reference label 230; the same label that is used to indicate an optical path may also be used herein to indicate light beams or sub-beams propagating along the respective optical path, so that for example channel sub-beams that impinge on the array of beam receiving elements 235 are generally referred to herein as the sub-beams 230.

FIG. 4A illustrates by way of example the array of beam receiving elements 235, upon which three sub-beams 230A, 230B and 230C having different center wavelengths $\lambda_A$, $\lambda_B$ and $\lambda_C$, impinge. By design the array 235 receives the three sub-beams 230A, 230B and 230C at elements $235_1$, $235_2$ and $235_4$, respectively, at different locations 281, 282 and 283 along the array as defined by the respective central wavelengths. Preferably, the array 235 is disposed in a focal surface of the spherical reflector 205, which, in cooperation with elements 204 and 206, forms spectrally dispersed images of an input device aperture, such as the aperture of an optical fiber port of the WDD 200, upon the array 235.

Figure 2:
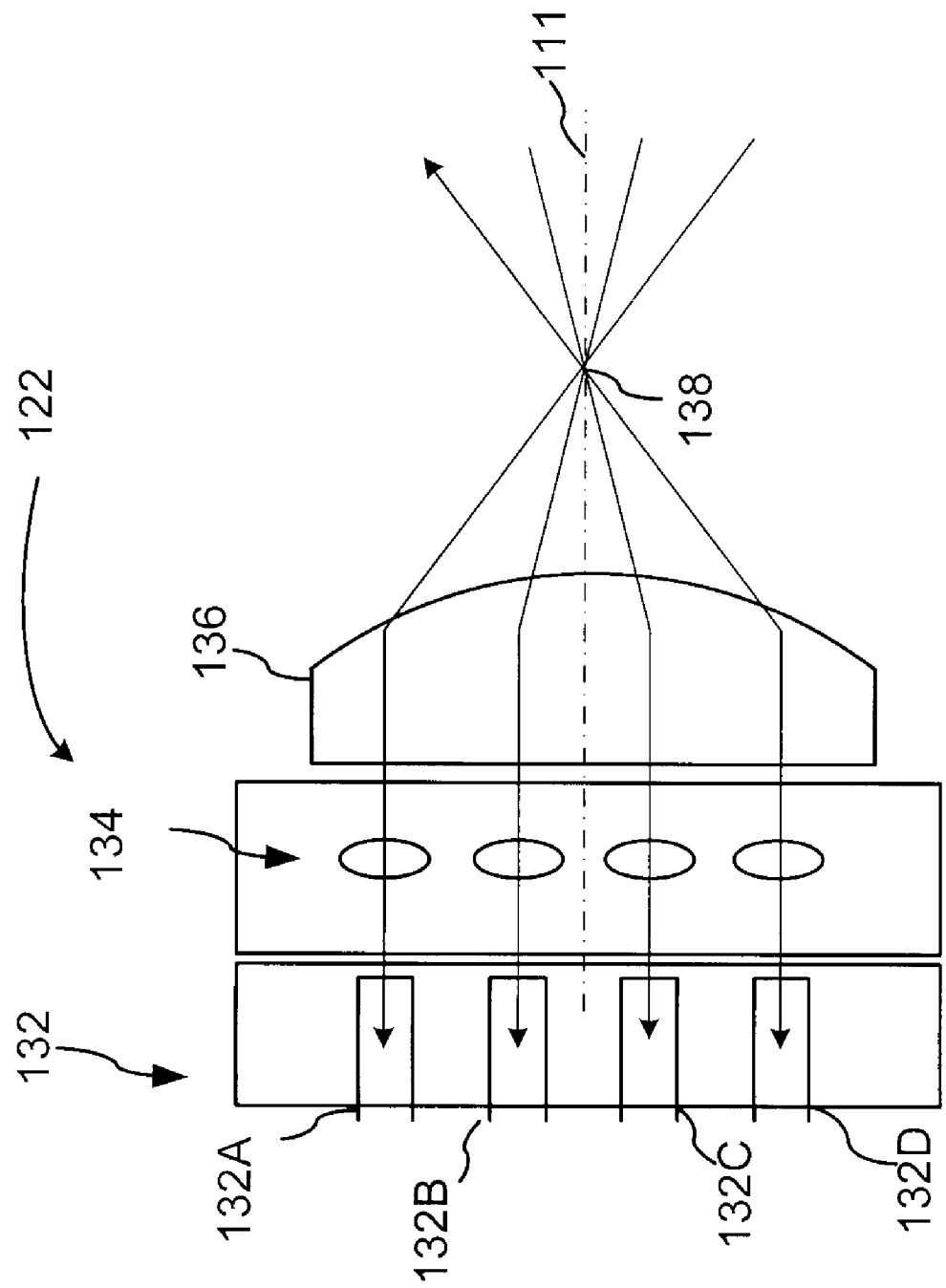
FIG. 2 is a schematic side view of one prior-art embodiment of the front-end unit of the device shown in FIG. 1.

In one embodiment wherein the WDD 200 operates as a WSS, the front end unit 122 may be as illustrated in FIG. 2, and may include an array of input/output optical ports 132A to 132D, each of which may have a corresponding lens of a lens array 134 coupled thereto for shaping the respective input/output beams; although four ports are shown, the WDD 200 in this embodiment may have any number of ports greater that two as suitable for a particular application. By way of example, the port 132D functions as an input port through which an input optical signal is launched, and is referred to hereinafter also as the first port. An angle to offset lens 136, also referred to herein as the switching lens 136, converts the lateral offset of the input/output ports 132A to 132D relative to an optical axis 111 into an angular beam offset at a point 138, which is imaged by the spherical mirror 205 onto the array of beam receiving elements 235. The lens array 134 is optional and can be absent in some embodiments. The optical ports 132A-D may be coupled to a ID fiber array 128, and may be in the form of ends of single mode optical fibers laid out in a row in parallel v-groves in a fiber array unit (FAU) 132.

In the WSS embodiment, the array of the beam receiving elements 235 may be an actuation array comprising a plurality of beam deflectors, which may be in the form of a micro-electro-mechanical (MEMS) array of tilting mirrors which can be used for selectively redirecting one or more of the channel sub-beams back to the spherical reflector 205 for reflecting said one or more of the sub-beams therefrom back to the WDR 206 for recombination into an output beam, whereupon the output beam, propagating generally along the optical path 232 in the opposite to the input optical signal direction, is redirected by the spherical reflector 205 and the switching lens 136 of the front-end unit 122 to a selected one of the fiber-optic ports 132.

Figure 5:
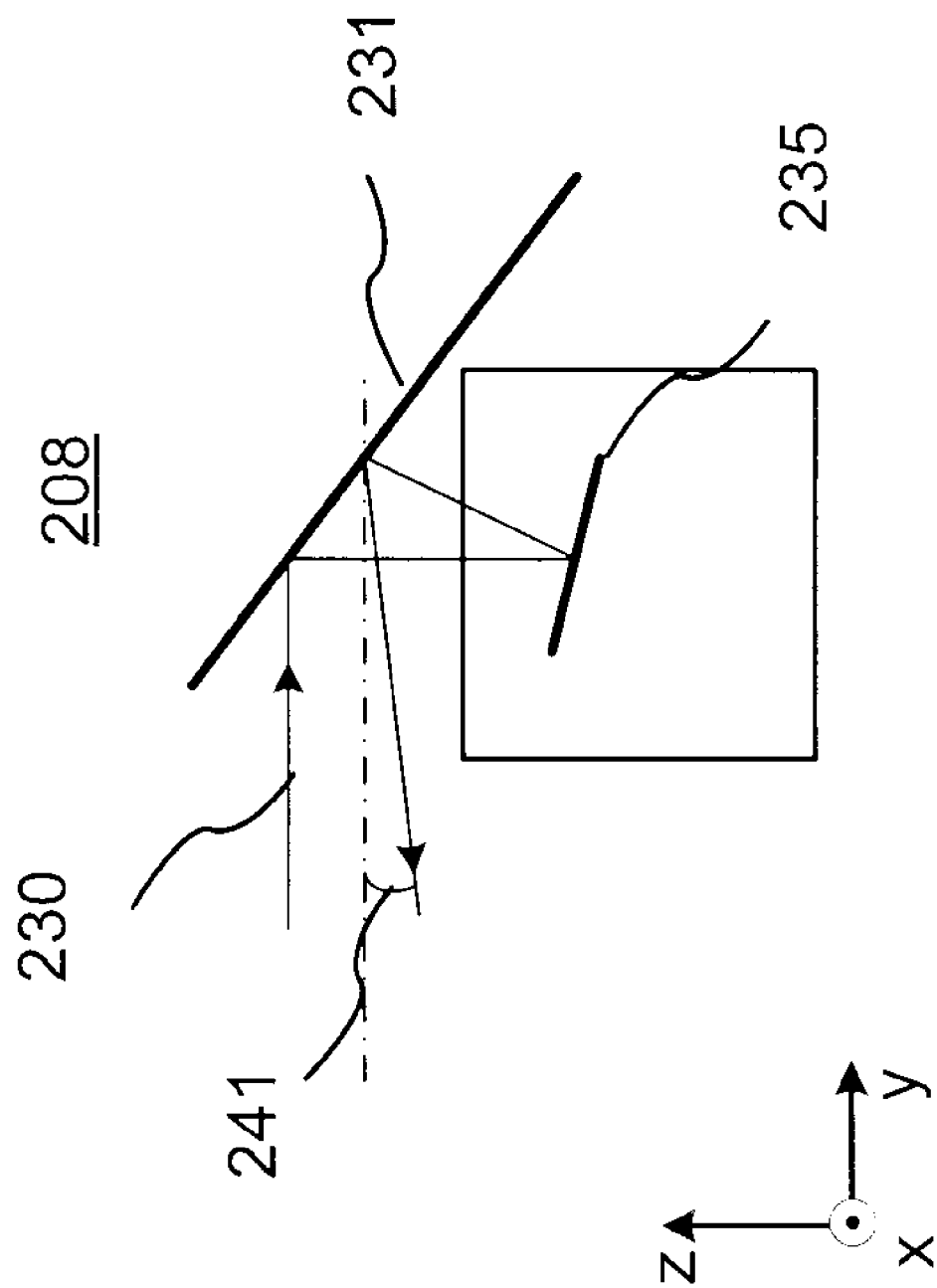
FIG. 5 is a schematic side view of one embodiment of the back-end unit of the WDD of FIG. 3.

Referring to FIG. 5, one such embodiment of the back-end unit 208, which is shown in a side view in a plane normal to the plane of FIG. 3, includes a vertical fold mirror 231 reflecting channel sub-beams 230 coming from the spherical mirror 205 downwardly into the plane of FIG. 3, each towards a different tilting MEMS mirror 235, only one of which is shown in FIG. 5. The tilting mirrors 235 direct the channel sub-beams back via the fold mirror 231 and the spherical mirror 205 towards WDR 206, where they are recombined into one or more output beams and directed back to couple into the front-end unit 122. The beam tilt angle 241 introduced at the back end unit 208 is transformed by the switching lens 136 to a lateral offset corresponding to the desired input/output fiber port 132A to 132D. Alternatively, the actuation array 235 may include a liquid crystal phased array (LC or LCoS, if incorporated on a silicon driver substrate) that is operable to redirect the light as shown in FIG. 5, as described for example in U.S. Pat. No. 6,707,959 that is incorporated herein by reference.

In another embodiment wherein the WDD 200 operates as a DGE or a WB, the beam receiving elements 125 may be LC-based reflectors including LC cells for controllably rotating the polarization of the sub-beams to selectively attenuate or block the sub-beams, as described for example in U.S. Pat. No. 6,498,872 and No 6,810,169, which are incorporated herein by reference. In this embodiment, the front-end unit may include a single input/output fiber optic port followed by a circulator or one input port and one output port.

In yet another embodiment the beam receiving elements 125 may be photodetectors forming a photodetector array, and the WDD 200 operates as a spectrograph, wherein electrical signal generated by each of the photodetectors is associated with a different wavelength.

In any of the aforedescribed embodiments, an aberration correction element 204 may be optionally installed between the spherical reflector 205 and the back-end unit 208 in the optical paths 230 of the channel sub-beams and, in some embodiments, in the optical paths 201 of the input beam. The purpose of this correction element is to modify the paths of the optical signals focused by the spherical mirror 205, so as to effectively rotate a best fit planar surface approximation focal plane associated with the spherical reflector 205 into coplanar coincidence with the optical signal-receiving surface of the array 235. Examples of suitable field-flattening aberration correction elements that may be used for this purpose include a portion or segment of a cylindrical lens and an optically transparent wedged prism. The aberration correction element 204 will be referred to hereinafter as the aberration correction prism 204.

Figure 6:
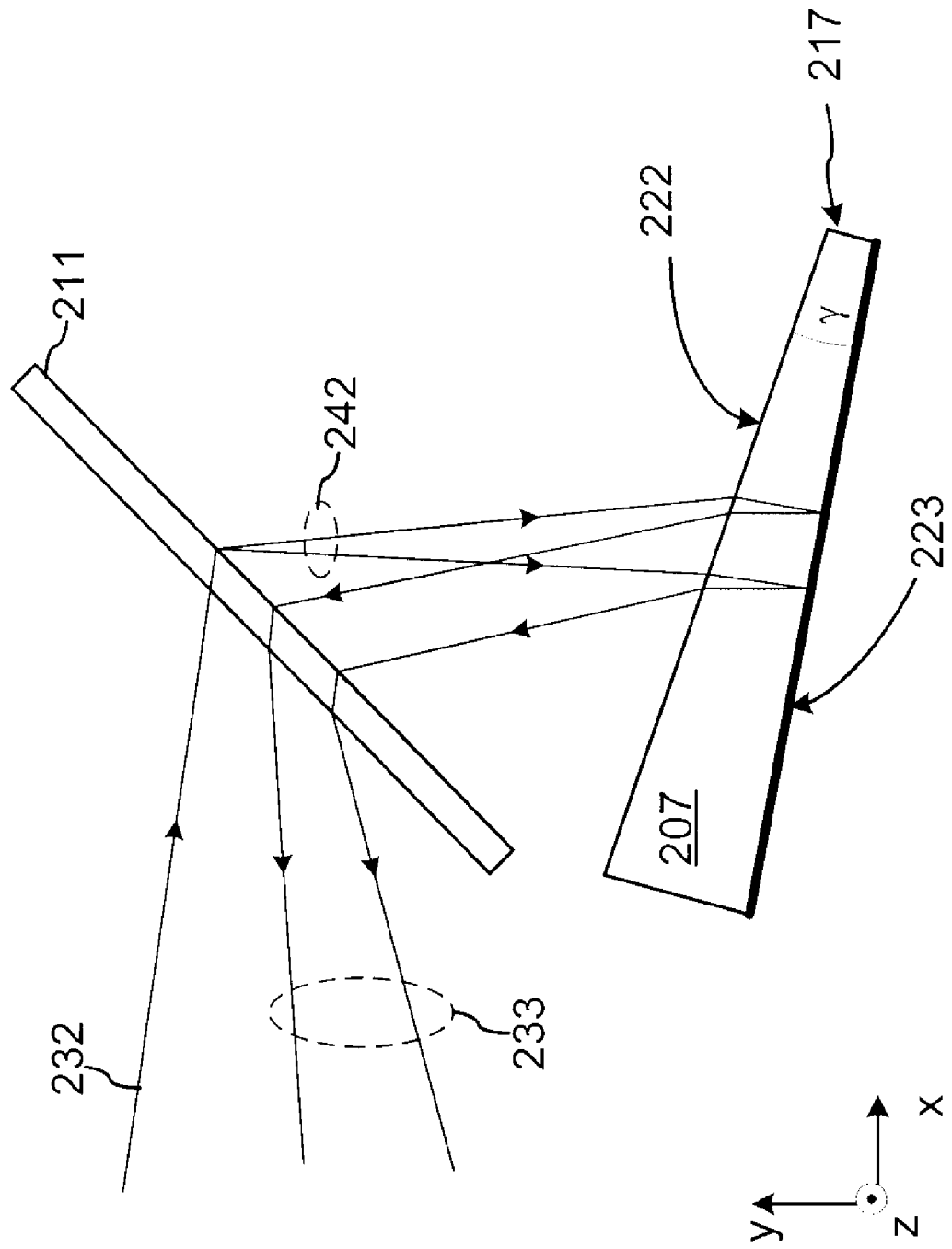
FIG. 6 is a is a zoomed-in view of the WDR shown in FIG. 3 illustrating two spatially separated sub-beams.

Again with reference to FIG. 3, the WDR 206 according to one aspect of the invention includes a transmission diffraction grating (TDG) 211, which may be embodied as a relief grating formed on a transmissive substrate 210, and a wedge-shaped prism 207 having a reflective back surface 223 forming with a front surface 222 an apex angle 225γ. The wedge-shaped prism will also be referred to herein as a first wedged prism 207, a first prism 207 or simply as a prism 207. As illustrated in FIG. 6 in somewhat greater detail, the TDG 211 disperses the beam of light incident along the optical path 232 into its constituent wavelength channels by means of diffraction, and transmits these channels in the form of channel sub-beams along divergent optical paths 242 towards the first prism 207, which according to one aspect of the invention operates as a beam-fold mirror redirecting the channel sub-beams back through the TDG 211, where they experience a second diffraction, whereby advantageously doubling the wavelength dispersion power of the TDG 211.

According to another aspect of the invention, the first prism 207 compensates for temperature-induced variations in performance-affecting properties of different optical and opto-mechanical elements of the device, as will be described hereinbelow. The first prism 207 may be made with different optical materials that are substantially transparent in the operating wavelength range of the WDD 200, including, but not limited to: optical glasses, optical plastics, optical crystals, and may also include gases, liquids or vacuum. The optical material of the prism 207 may be selected to have positive or negative dn/dT or a combination thereof in order to obtain a desired variation in refraction over temperature. By way of example, the substrate 210 of the TDG 211 and the first prism 207 are made from fused silica. The front and back surfaces 222, 223 of the prism 207 will also be referred to herein as the first and second surface or face of said prism, respectively.

Referring again to FIG. 4A, it is desirable that the locations 281-283 in the array 235, at which the channel sub-beams 230A-230C impinge, depend only upon the central wavelengths of the sub-beams and do not change during the device operation or over lifetime of the device for any give central wavelength within an operating wavelength range of the device. However, variations of the device temperature may affect these locations by causing the sub-beams 201A-201C to shift along the array, for example as illustrated by an arrow 228 in FIG. 4A. FIG. 4B shows by way of example new positions of the sub-beams 230A-230C along the array 235 that are shifted from the original 'design' locations 281-283 due to a change in the device temperature. In the context of this invention, the term "device temperature" is used to mean the ambient temperature within the respective WDD, which is typically defined by the temperature of the device housing and varies in time in a substantially same way as the temperature of each optical element of the device. For example, in FIG. 4B the sub-beam 201A is shown to impinge at a new location 281' that is shifted from the design location 281 by Δy, with the other sub-beams experiencing a similar temperature-induced shift. This temperature induced shift may detrimentally affect output spectral characteristics of the WDD 200. For example in the WSS embodiment where the array elements 235 are tiltable micro-mirrors, the spectral content and the central wavelength of sub-beams reflected by each of the micro-mirrors 235 may change due to the thermal shift of the incident sub-beams, leading to a spectral shift of the output beam.

As the temperature of the optical system of the WDD 200 changes, a number of effects may cause the optical beam paths through the system to vary with temperature, resulting in the shifts of the locations 281-283 at which the sub-beams are received by the array 325. These effects include thermal expansion or contraction of different elements in proportion to their respective coefficients of thermal expansion (CTE), thermally-induced changes of refraction index n of optical elements in proportion to rates dn/dT of the refractive index change with temperature of the particular optical materials, which cause angles of refraction in the system to vary according to Snell's Law, and relative displacement of different optical elements due to thermal expansion gradients of a supporting mechanical structure.

Choosing optical materials and designing mechanical support structures to make the positions of the spectrally dispersed images on the focal surface invariant over temperature may not be practical or possible, as materials with the required values of dn/dT and CTE may not exist, or may have other properties or costs which make them impractical. Furthermore, modifying the design of the imaging optics to achieve temperature invariance may compromise imaging properties of the optical system.

By way of example, in one embodiment elements 136, 204, 205, 210 and 207 are made of low expansion fused silica material. Elements 122, 136, 204, 205, 210, 207, and 208 are held together with a low expansion Invar metal frame schematically show at 250, also referred to herein as a housing. The array 235 is in the form of a MEMS chip held on a Pyrex substrate, which is mounted on an alumina ceramic carrier (not shown). The invar frame 250 is attached to the ceramic carrier with a post located near the MEMS chip 235. Despite using low expansion materials, computer aided analysis showed an unacceptably large thermal shift of the sub-beam receiving locations 281-283 at the MEMS array 235, before benefits of the present invention are realized as described hereinbelow.

Some of the effects that may cause this temperature-induced shift in the WDD 200 include: variations in refracted angles at the surfaces of the switching lens 136, the optional beam-shaping lens 135, and the aberration correction prism 204 due to the dependence of the index of refraction n of a transmissive optical element on its temperature T, which is typically characterized by the dn/dT parameter of the respective optical material; thermal expansion of the TDG 211, which causes diffraction angles experiencing by the sub-beams to vary with T; variation of the focal length of the spherical mirror 205 due to its thermal expansion; thermal expansion of the array 235; translation of the array 235 relative to the invar frame due to the differential thermal expansion of the invar frame and ceramic carrier; tilts and translation of elements 122, 135, 204, 205, 206, 208 relative to one another due to CTE of the invar frame, and distortion of the invar frame due to differential expansion of the invar frame and the ceramic carrier.

Aspects of the present invention related to compensation of thermally-induced shifts in the WDD 200 will now be described with reference to FIG. 7, which illustrates the internal structure and operation of the WDR 206 in greater detail.

According to one aspect of the invention, the WDR 206 produces a pre-determined non-zero shift in a diffraction angle over temperature, which counteracts and at least partially compensates temperature-induced variations of optical paths 201, 232 of the input optical beam, and temperature-induced variations of the optical paths 230 of the channel sub-beams from the spherical mirror 205 to the array 235, which occur outside of the wavelength dispersive reflector.

Figure 7:
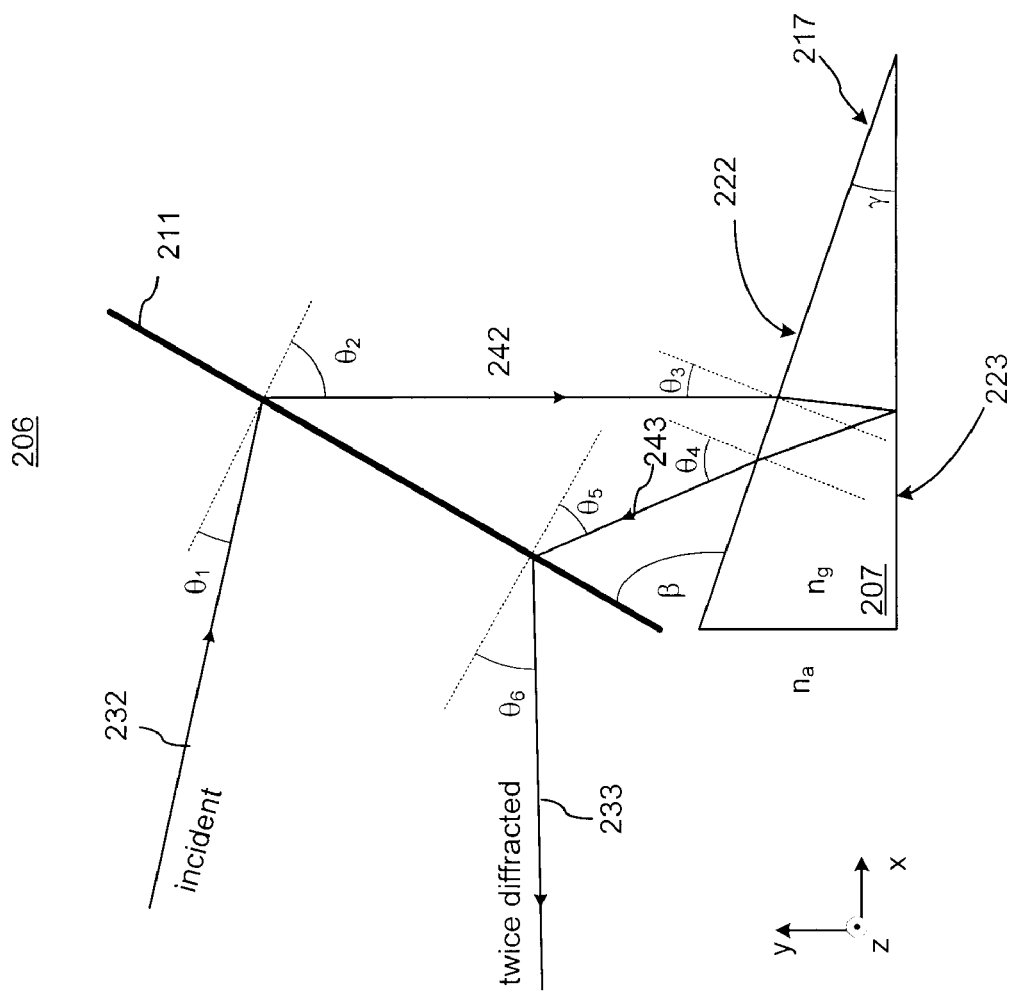
FIG. 7 is a diagram illustrating diffraction and refraction of a channel sub-beam propagating in the WDR of FIG. 3.

Functioning of the embodiment of the WDR 206 of FIGS. 3 and 7 according to this aspect of the invention can be explain by considering the propagation of a single channel sub-beam therein.

Referring to FIG. 7, the input optical signal 232 impinges upon the transmission diffraction grating 211 at an angle of incidence $\theta_1$, and is dispersed into a plurality of transmitted sub-beams, of which a single channel sub-beam 242 is shown. The transmitted channel sub-beam represented by a ray 242 is diffracted by the TDR 211 at an angle $\theta_2$ according to the grating equation (1):

$$\sin\theta_1 - \sin\theta_2 = \frac{m\lambda}{dn_a}, \quad (1)$$

where m is the diffraction order, $\lambda$ is the central wavelength of the sub-beam in vacuum, d is the grating period of the TDG 211, and $n_a$ is the refractive index of the surrounding medium, for example air.

Ray 242 is incident on the first surface 222 of the prism 207 at an angle of incidence $\theta_3$ given by equation (2):

$$\theta_3 = \beta - \theta_2 \quad (2)$$

where $\beta$ is the angle between the TDG 211 and the first surface 222 of the prism 207, and is also referred to herein as the prism orientation angle. The wedged-shaped prism 207 has an index of refraction $n_g$, and an apex angle $\gamma$. Ray 242 is refracted at the first surface 222 following Snell's law, then reflected at the reflective second, or back surface 223 of the prism 207, then is refracted again at the first surface 222, and exits prism 207 as a ray 243 at an angle of refraction $\theta_4$, which is related to $\theta_3$ according to the following equation (3):

$$\sin\theta_4 = \frac{n_g}{n_a}\sin\left(2\gamma - \sin^{-1}\left(\frac{n_a}{n_g}\sin\theta_3\right)\right) \quad (3)$$

Ray 243 is coupled back to the TDG 211 at an angle of incidence $\theta_5$ that is given by equation (4):

$$\theta_5 = \beta - \theta_4 \quad (4)$$

Upon transmitting through the TDG 211, the ray 243 is diffracted a second time thereupon, and exists the TDG 211 with the channel sub-beam 233 at an angle $\theta_6$ thereto. The angle $\theta_6$, which defines the first angle 215 and the direction of the first optical path 233 of the corresponding channel sub-beam relative to the TDG 211, satisfies the diffraction equation (5):

$$\sin\theta_5 - \sin\theta_6 = \frac{m\lambda}{dn_a} \quad (5)$$

The WDR 206 is thus effective in producing a wavelength dependent angle $\theta_d = \theta_6 - \theta_1$ between the input beam 232 and the channel sub-beam 233, which has been twice diffracted by the TDG 211.

When the ambient temperature T inside the WDD 200 changes, a thermal expansion or contraction of the substrate material of the TDG 211 changes the grating period d, resulting in changes in the diffraction angles $\theta_6$ and $\theta_2$. If the grating period at a reference temperature $T_0$ is equal to $d_0$, and the linear coefficient of thermal expansion (CTE) of the substrate material is $\alpha$, the period d at a different temperature T can be found from the following equation (6):

$$d(T) = d_0[1 + \alpha(T - T_0)] \quad (6)$$

The refractive indices $n_a$ and $n_g$ may also be functions of temperature, as described by the following equations (7) and (8):

$$n_a(T) = n_{a,T0} + \frac{dn_a}{dT}(T - T_0) \quad (7)$$

$$n_g(T) = n_{g,T0} + \frac{dn_g}{dT}(T - T_0) \quad (8)$$

The rate of change of the WDR diffraction angle $\theta_6$ with temperature can be determined using equations (1) through (8), which take into account the temperature dependencies of the angles of diffraction on the TDG 211, and the angles of refraction on the front surface 222 of the prism 207.

Figure 8:
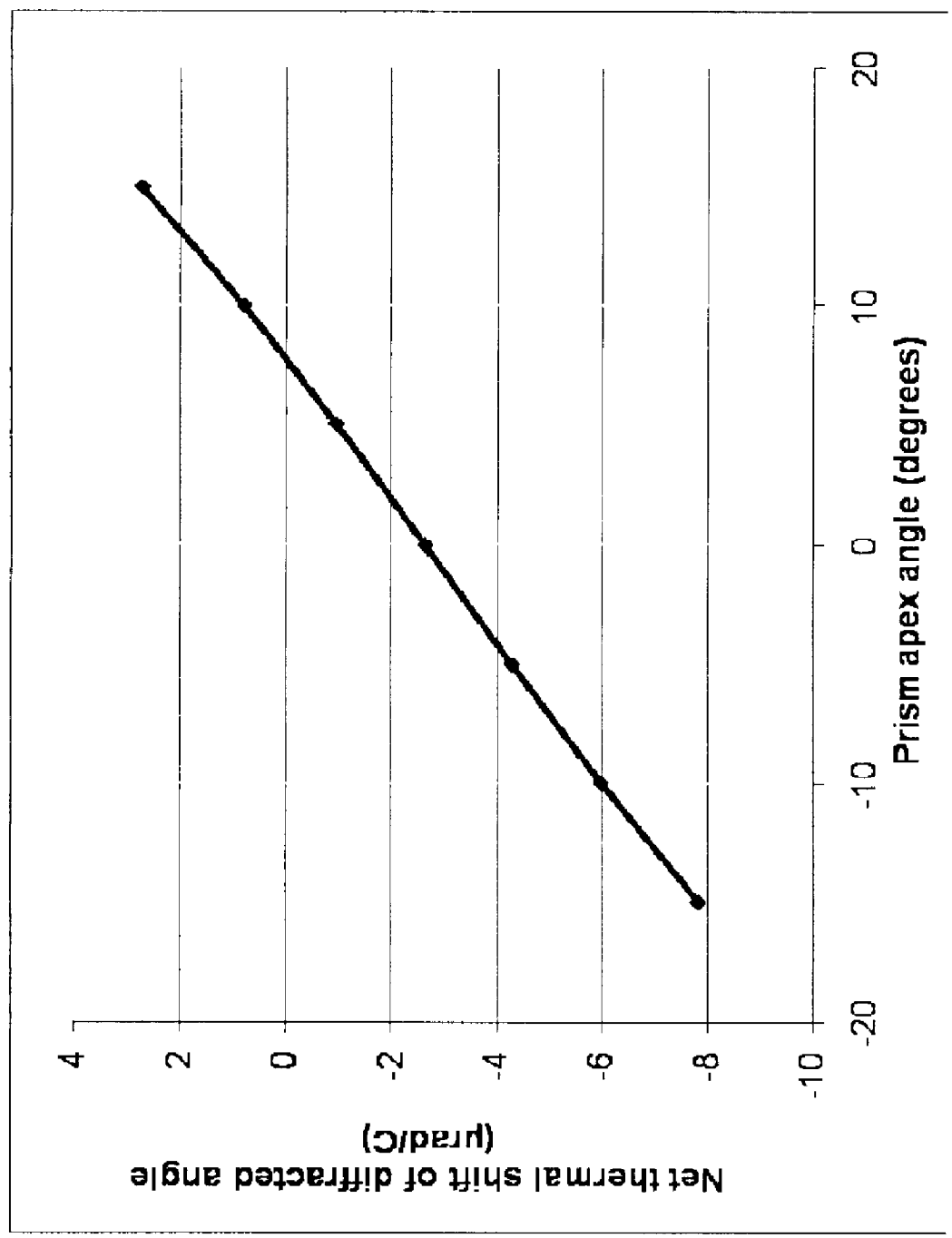
FIG. 8 is a graph showing an exemplary dependence of a rate of change with temperature of the output sub-beam angle of the WDR of FIG. 3.

By way of example, FIG. 8 shows a dependence of the rate of change R of the first angle 215 at the output of the WDR 206 with temperature due to a combined effect of the temperature-induced changes in the TDR 211 and in the first prism 207. The results shown in FIG. 8 have been computed using equations (1)-(8) for the following exemplary embodiment of the WDD 200: line spacing of the TDG 211 966.2 lines/mm, the first incident angle $\theta_1$ is 44 degrees, both the grating substrate and prism are made of fused silica glass, having a coefficient of thermal expansion of 0.5 ppm/°C., and a dn/dT of $8.4 \times 10^{-6}$ per °C. at $\lambda = 1550$ nm.

In this example, the TDG 211 alone, in the absence of the prism 207 with only the reflective surface 233, is responsible for an angular shift of the first optical path 233 with temperature at a rate of approximately R=−2.6 μrad/C, where μrad stands for microradians. At an apex angle $\gamma = \gamma_0 \sim 7.5$ degrees and $\beta$ about 60 degrees, the temperature-induced variations in the sub-beam refraction at the prism 207 exactly compensate the temperature-induced variations of the sub-beam diffraction at the TDG 211, resulting in R=0. Note that negative values of the apex angle correspond to a slope of the first face 222 which is opposite to that shown in FIG. 7, i.e. when the first prism 207 is oriented with an apex side 217 thereof towards the TDG 211. In this embodiment, in order for the first prism 207 to counteract the effects of temperature variations of the TDG 211, the first prism 207 should be oriented with the apex side thereof 217 away from the TDG 211, as shown in FIGS. 3 and 7.

It may be preferable to select the prism 207 so that it over-compensates or under-compensates the beam-tilting effect of a temperature expansion of the TDG 211, so that the WDR 206 could compensate for temperature-induced variations in the second optical path 201 that occur outside of the WDR 206.

It will be appreciated that equations (1)-(8), and the results shown in FIG. 8, although generally correctly illustrating certain features of the present invention, are approximate, and a more rigorous design of the optical subs-system of the WDD 200, including effects of the device temperature variations, may require using commercial computer aided design software as known to those skilled in the arts. In particular, finite element analysis software available for example from ANSYS, Inc. can be used to calculate mechanical displacements and distortions of the packaging, frames, and optical elements. Optical ray tracing software such as ZEMAX® or CODE V® can then be used to calculate the optical effects of temperature, taking into account the aforementioned mechanical distortions and displacements, along with changes in the refractive index of optical materials and media, and diffractive properties of the diffractive elements.

In the optical design of the WDD 200 with a particular grating period do, angles $\theta_1$ and $\theta_6$ may be chosen to give a desired combination of grating dispersion, diffraction efficiency, and optical imaging properties. In such embodiments wherein $\theta_1$ and $\theta_6$ are fixed by the system design, the channel sub-beam shift $\Delta y$ at the array 235 over temperature for a particular center wavelength may be computed using various commercially available software for optical ray-tracing and opto-mechanical FEA (finite element analysis) known to those skilled in the art.

As we found, by suitably selecting the apex angle $\gamma$ of the prism 207 and the orientation thereof relative to the WDG 211 as defined by the angle $\beta$ between the front surface 222 of the prism 207 and the TDG 211, temperature-induced variations of the second optical paths 201 can be substantially eliminated or at least significantly reduced, resulting in a significant reduction or elimination of the channel sub-beam shift $\Delta y$ at the array 235, and making the locations at the array 235 at which channel sub-beams of given central wavelengths are received substantially temperature independent in an operating temperature range of the device.

In particular, the angles $\gamma$ and $\beta$ can be selected for providing a desired value of the first angle 215 at a reference temperature, while causing the first angle 215 to vary with the temperature of the device at a non-zero rate R so as to counteract and substantially cancel temperature-induced variations of the optical paths 232 and 230 that occur outside of the WDR 206. According to one aspect of the invention, the apex angle and orientation of the first prism 207 is preferably chosen so that the temperature rate R of the angular tilt of the sub-beams 233 at the output of the WDR 206 is at least 1 $\mu$rad/C.

By way of example, we computed the sub-beam movement along the array 235 for an embodiment of the WDD 200 of FIG. 3 using commercial optical ray-tracing software, for an optical frequency of 193.9 THz, and the following device parameters: the line spacing of the TDG 211 is 966.2 lines/mm, the first incident angle $\theta_1$ is 44 degrees, the grating substrate of the TDG 211 and prisms 204 and 207 made of fused silica glass having a coefficient of thermal expansion of 0.5 ppm/° C., and a dn/dT of $8.4 \times 10^{-6}$ per ° C. at $\lambda$=1550 nm. The spherical mirror 205 has a focal length of f=42.5 mm, with changes $\Delta\phi$ in the WDR output angle 215 $\phi$ being mapped to sub-beam shifts $\Delta y$ along the array 235 according to the following equation (9):

$$\Delta y = f \times \Delta\phi. \quad (9)$$

Further in this example, the sub-beam shift $\Delta y$ along the array 235 was computed for a temperature change $\Delta T$=50° C. The calculations showed a sub-beam shift $\Delta y$ of +5.4 $\mu$m due to the thermal expansion of the TDG 211 alone, a shift of +5.7 $\mu$m due to refractive index change with temperature of the second aberration correction prism 204 alone, and a shift of −0.4 $\mu$m due to thermal effects on other optical parts, not including the first thermal compensation prism 207, combined. Accordingly, the net thermal beam shift that needs to be corrected in this system in the absence of the first prism 207 is the sum of these 3 values, i.e. +10.7 $\mu$m, and in this embodiment is defined primarily by the TDG 211 and the aberration-correcting prism 204. By way of example, a sub-beam shift of 1 $\mu$m along the array 235 may result in about 1 GHz central wavelength error for an optical channel centered at 193.9 THz, so that a net sub-beam shift at the array 235 of 10.7 $\mu$m, if not compensated, may result in about 10.7 GHz error in the central wavelength, which would be detrimental in many applications.

Accordingly, the apex angle $\gamma$ and the orientation angle $\alpha$ of the first prism 207 are chosen so its refractive index change over $\Delta T$ causes a sub-beam shift $\Delta y$=−10.7 $\mu$m in order to substantially fully compensate the thermal shifts due to the grating 211 expansion, refractive index change of the aberration correction prism 204, and thermal effects in other optical elements, providing a substantially zero, or less than about 0.3 $\mu$m, sub-beam shift $\Delta y$ at the array 235 when the device temperature changes by 50 degrees. In this example, the angle $\beta$ between the grating 211 and the prism first face 222 is 71.1°, and the apex angle $\gamma$ of the first prism 207 is 15 degrees, corresponding to a rate R of angular tilt with temperature of the sub-beams 233 at the output of the WDR 206 of about 2.7 $\mu$rad/C. Note that the first prism 207 is substantially overcompensating the thermal shifts due to the thermal expansion of the TDG 211 alone, in order to provide a substantially reduced thermal shift of the center wavelength for the entire optical system.

FIGS. 3 and 7 illustrate one embodiment of the WDR of the present invention that can be designed to provide angular shifting of the diffracted sub-beams at the output of the WDR with temperature at a pre-defined positive or negative rate, for example with an absolute value greater than 1 $\mu$rad/C, thereby enabling passive auto-compensation of thermally-induced changes in the spectral characteristics of a WDD.

FIGS. 9 and 13 schematically illustrate two other embodiments of the WDR of the present invention, which are identified with reference labels 206' and 206'', which are shown by way of illustration in the context of the same general WDD platform as that of FIG. 3, and have similar functionality to that of WDR 206.

Turning first to FIG. 9, a WDD 300 is shown that is otherwise identical to WDD 200, but with a WDR 206' replacing the WDR 206 of FIGS. 3 and 7. The WDD 300 operates generally as described hereinabove with reference to FIG. 3, with like element having like reference labels.

The WDR 206' of FIG. 9 differs from the WDR 206 of FIGS. 3 and 7 in that in the WDR 206' the first prism 307 is positioned in front of the TDG 211 in the optical paths of the channel sub-beams between the spherical mirror 205 and the TDG 211. A mirror 323 is disposed optically after the TDG 211 and provides a reflective surface for reflecting the channel sub-beams transmitted through the TDG 211 to couple back into the TDG 211, so that the TDG 211 operates in a double-pass configuration for effectively doubling its dispersion power. By suitably selecting the apex angle and orientation of the first prism 307 with respect to the TDG 211, the first prism 307 may be effective in counteracting the effects of temperature variations on the TDG 211 and other elements of the device, thus enabling the temperature compensation.

Figure 10:
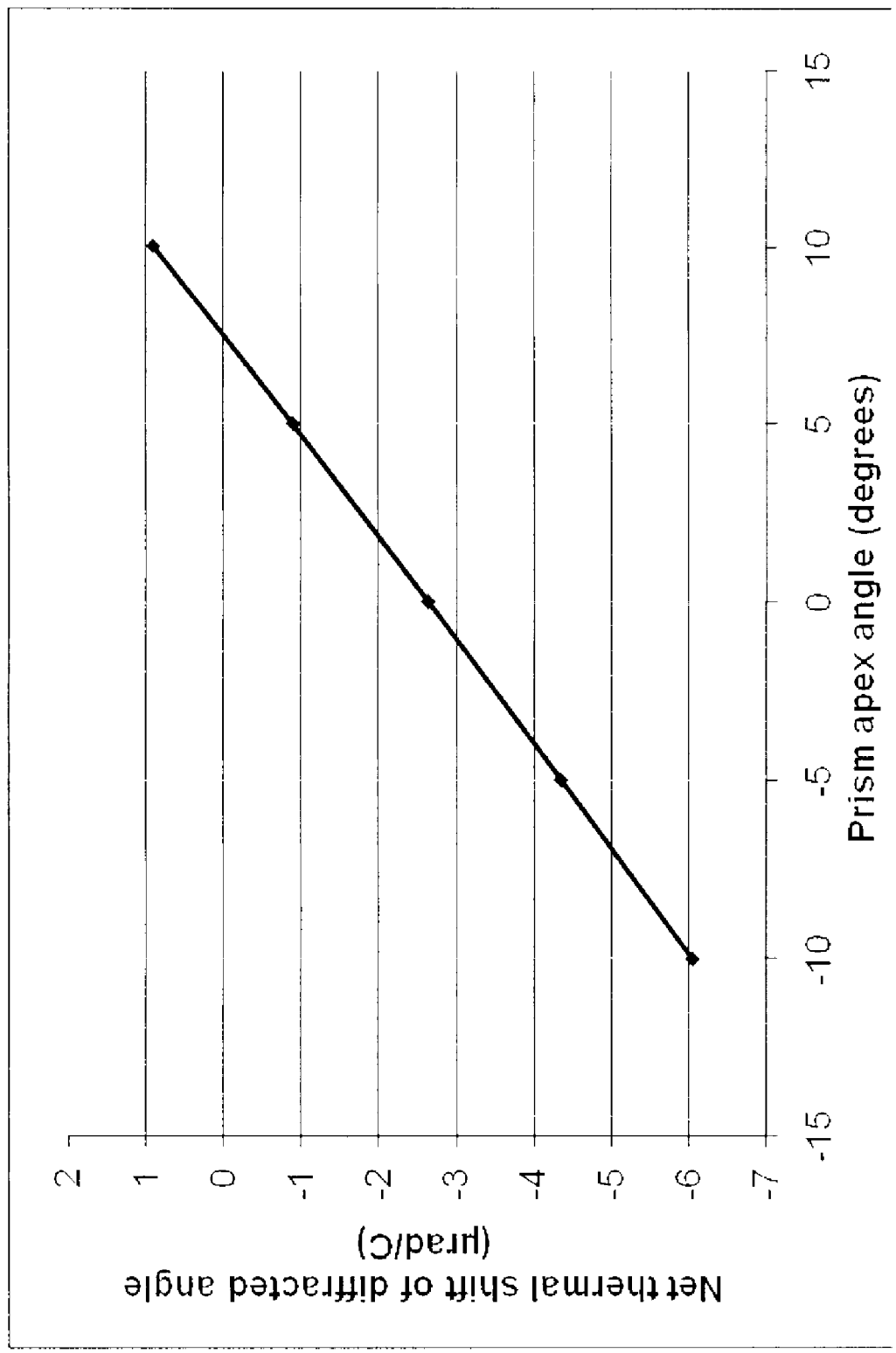
FIG. 10 is a graph illustrating an exemplary dependence of the rate of change with temperature of the output sub-beam angle of the WDR of FIG. 9.

By way of example, FIG. 10 illustrates the dependence of the rate of change R of the first angle 215 at the output of the WDR 206' with temperature for an embodiment wherein the input optical signal is incident upon the first prism 307 at about zero incidence angle.

Similarly to the WDR 206 of FIGS. 3 and 7, the WDR 206' can be configured to provide angular shifting of the diffracted sub-beams with temperature at a pre-defined positive or negative rate, thereby enabling passive auto-compensation of thermally-induced changes in the spectral characteristics of the WDD 300, and is thus effective in providing passive auto-compensation of temperature-induced variations in the spectral characteristics of a WDD.

Compared to the embodiment of FIG. 3, one drawback of the embodiment of FIG. 9, wherein the first prism is separate from the TDG 211, is that the channel sub-beams have to pass at least twice each of the faces of the first prism 307, thereby experiencing additional optical loss due to undesired reflections at the prism-air interfaces. Moreover, in the WSS embodiment of the WDD 300, wherein the array 235 reflects the sub-beams back for recombining at the TDG 211 into one or more output beams, the channel sub-beams pass the air-prism interfaces of the prism 307 as many as eight times in total. Although the faces of the prism 307 can be anti-reflection coated, the additional optical loss associated therewith nevertheless can be disadvantageous for some applications of the WDD 300. Another potential drawback of the WDR 206' of FIG. 9 is the necessity to align three optical elements instead of two when assembling the WDR 206'.

Therefore, in another embodiment the first prism 307 may be made integral with the TDG 211, thereby avoiding the aforedescribed potential drawbacks of the WDR design of FIG. 9. This embodiment of the WDR 206' is schematically shown in FIG. 11, which also shows for illustration optical paths of three channel sub-beams produced by the TDG 211 from the input optical signal 232.

Figure 11:
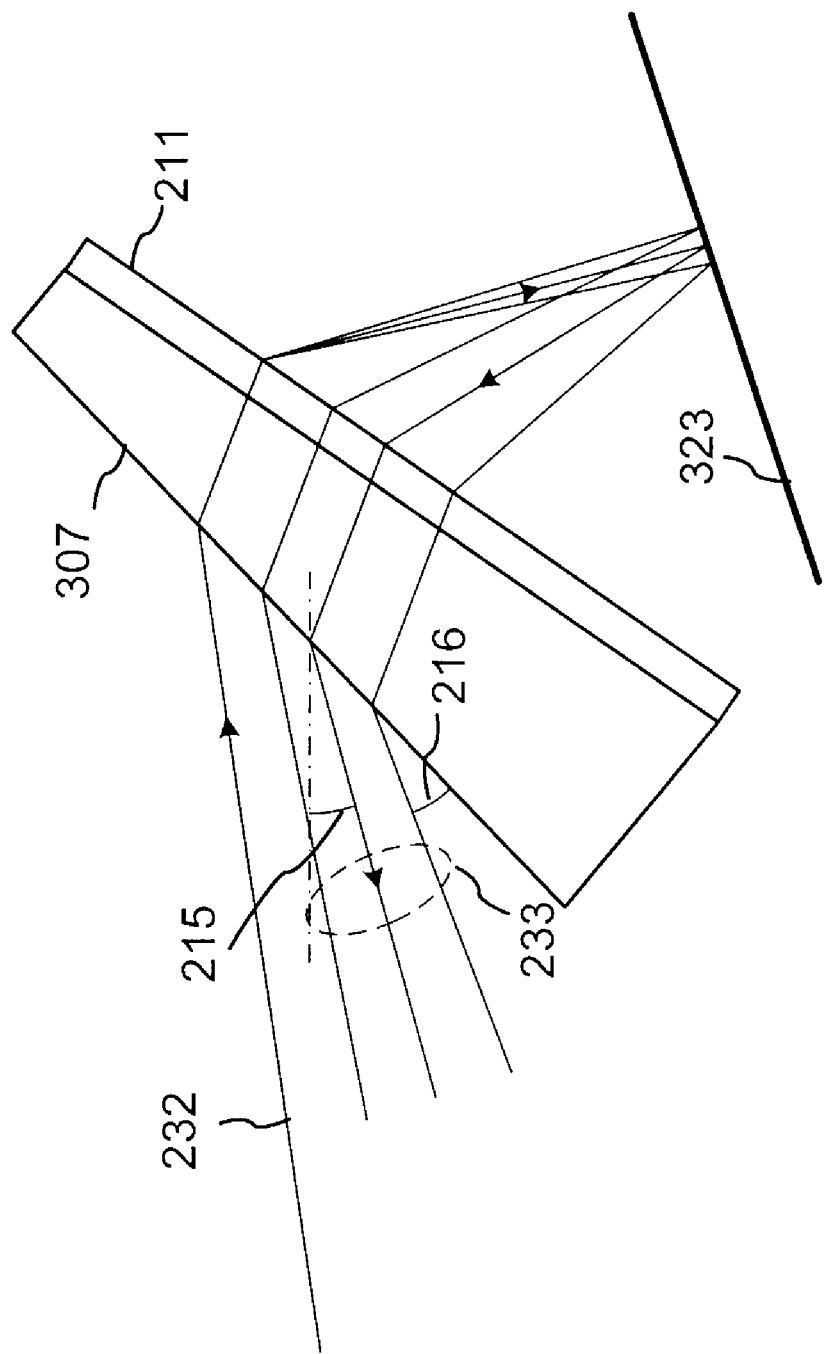
FIG. 11 is a schematic representation of another embodiment of the WDR of FIG. 9.
Figure 12:
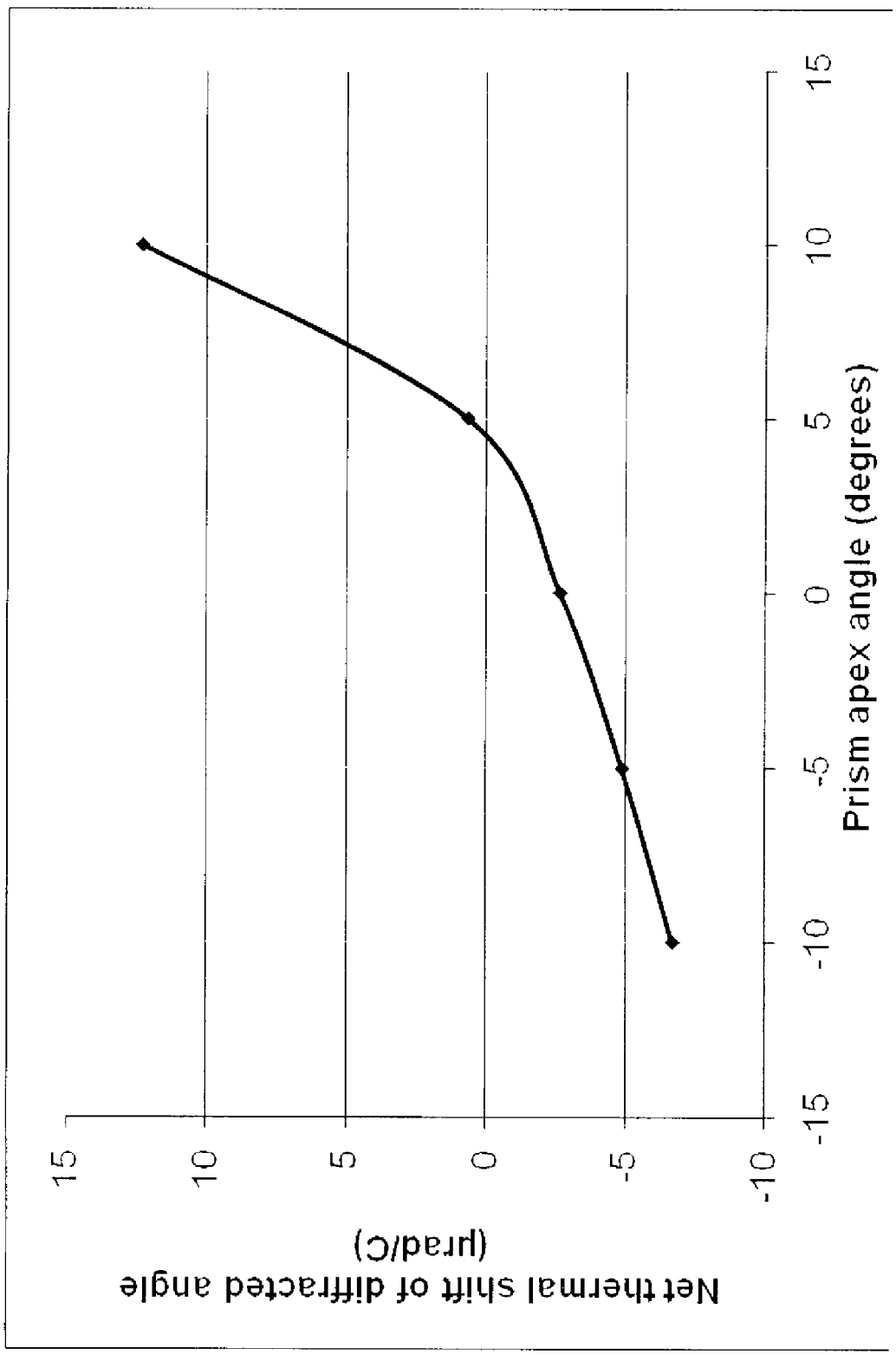
FIG. 12 is a graph illustrating an exemplary dependence of the rate of change with temperature of the output sub-beam angle of the WDR of FIG. 11.

FIG. 12 illustrates by way of example the dependence of the rate R of change of the first angle 215 at the output of the WDR 206' with temperature for the WDR embodiment of FIG. 11. Clearly, by suitably adjusting the apex angle of the prism 307, this embodiment of the WDR 206' can also be configured to compensate both positive and negative shifts of the sub-beam locations on the array 235 due to temperature changes in opto-mechanical properties of the WDD 300 outside of the WDR 206'.

One potential drawback of this configuration as compared with the embodiment of FIG. 3 is that it may require that the input optical signal and the output channel sub-bands impinge upon the prism-air interface of the first prism 307 at rather large angles of incidence. For example, when the prism apex angle of the first prism 307 in the configuration of FIG. 11 is about 5° to compensate for the CTE of the TDG 211, the sub-beams 233 may have to exit the first prism 307 at an exit angle 216 of less than 30° to the prism-air interface, which makes providing an effective AR coating thereof more difficult. The difficulties of providing an effective AR coating of the prism 307 are even greater if the WDR of FIG. 11 has to provide a net angular shift with temperature of the order of 10 μrad/C, as in the example described hereinabove with reference to temperature compensation of the WDD 200, which may require the exit angle 216 to be less than 15°.

Referring now to FIG. 13, a WDD 400 is illustrated which utilizes another embodiment of the WDR 206 of the present invention, which is indicated with a reference label 206". The WDD 400 operates generally as described hereinabove with reference to FIG. 3, with like element having like reference labels.

Similarly to the WDR 206 of FIGS. 3 and 7, the WDD 206" includes the TDG 211 followed with the first prism 207' having the reflective back surface 223 and the refractive from surface 222 oriented at an angle to the TDG 211. Additionally, the WDR 206" includes a second wedged prism 407 disposed in front of the TDG 211 integral therewith facing the spherical reflector 205, for refracting the sub-beams at angles of refraction that depend on temperature so as to further counteract temperature-induced variations of the second optical paths that occur outside of the WDR 206". The WDR 206" functions similarly to the WDR 206 and 206' described hereinabove, and may provide additional advantages by enabling a more flexible optical design of the WDR, at a cost of having an additional optical component.

Figure 14:
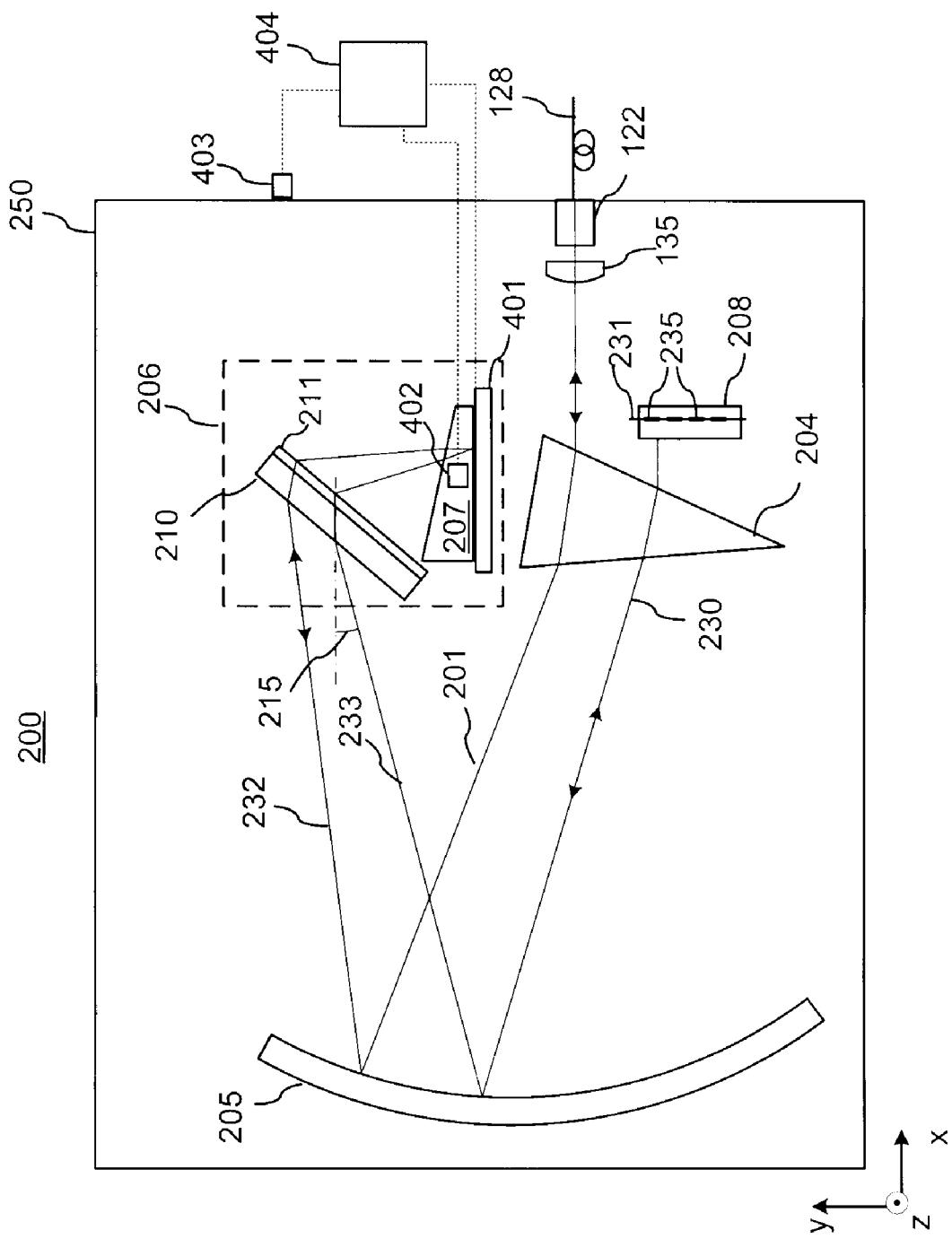
FIG. 14 is a schematic view of the WDD of FIG. 3 with an active temperature control of the first prism.

In another aspect of the invention, the desired variation in the WDR output angle 215 may be achieved with active temperature control of the first prism 207. In one embodiment illustrated in FIG. 14, a heater or thermo-electrical cooler (TEC) 401 and a temperature sensor 402 are thermally coupled to the first prism 207, and the temperature thereof is controlled in a feedback loop including a temperature controller 404, which may also be connected to a second temperature sensor 403 for measuring the ambient temperature within the device, which may be thermally coupled to the device housing or disposed therewithin at a distance from the first prism. The feedback loop may be controlled by a controller 404 and have a setpoint which may be varied as a function of the ambient temperature within the device, or of some other input parameter, thereby enabling adjusting the temperature shift of the output sub-beam angle of the WDR 206. This arrangement may be advantageous when the exact value of a required temperature shift of the first angle is not known in advance, for example when part tolerances or manufacturing process variations cause the required temperature drift R to vary from device to device. The first prism and TDG in this aspect of the invention may be chosen so as to passively provide a pre-determined value of the temperature shift, and temperature control of the first prism may be added to provide a fine tuning of the amount of temperature shift of the first angle.

It will be appreciated that the shown embodiments may be modified in many different ways within the scope of the present invention while still providing the benefits of the passive auto-compensation of temperature variations in a WDD. For example, although in the embodiments described hereinabove the first prism is configured so as to over-compensate the effect of temperature-induced variations of the TDG on the sub-beam output angle of the WDR, other embodiments are contemplated wherein temperature-induced shifts originated from optical and/or opto-mechanical components of the WDD outside of the WDR has a combined effect that is opposite to that of temperature-induced changes of the TDG, and the first prism is configured so as to under-compensate the effect of temperature-induced variations of the TDG on the sub-beam output angle of the WDR.

Of course numerous other embodiments may be envisioned without departing from the spirit and scope of the invention.

We claim:

1. A fiber optic wavelength dispersive device comprising:
   a front-end unit comprising a first port for launching an input optical signal;
   a wavelength dispersive reflector for receiving the input optical signal, for dispersing the input optical signal into a plurality of sub-beams of light with different central wavelengths, and for directing said sub-beams back at first angles along first optical paths in a dispersion plane;
   a spherical reflector for redirecting the input optical signal launched from the first port to the wavelength dispersive reflector, and for redirecting the sub-beams from the wavelength dispersive reflector back along second spatially separated optical paths; and,
   an array of beam receiving elements for receiving each of the sub-beams at a different location along the array according to the central wavelength thereof;
   wherein the wavelength dispersive reflector comprises:
      a transmissive dispersion grating (TDG) for receiving the input optical signal and for transmitting each of the plurality of sub-beams of light at a different angle of diffraction,
      a reflective surface spaced from the TDG for reflecting the plurality of sub-beams of light back through the TDG, and
      a first wedged prism of an optically transparent material for refracting each of the sub-beams of light in the dispersion plane at an angle of refraction dependent on the temperature of the device, the first wedged prism having an apex angle;

wherein a shift in the angles of refraction of the sub-beams provided by the first wedged prism due to a change in the temperature of the device at least partially compensates for a shift in the angles of diffraction caused by the change in the temperature of the device.

2. The device of claim 1, wherein the apex angle of the first wedged prism is such that the first wedged prism is effective to cause the first angles to vary with the temperature of the device at a rate of at least 1 μrad/C so as to counteract temperature-induced variations of the second optical paths that occur outside of the wavelength dispersive reflector.

3. The device of claim 2, wherein the first wedged prism is disposed between the diffraction grating and the reflective surface.

4. The device of claim 3, wherein the first wedged prism has a first surface facing the diffraction grating and a second surface defining the apex angle with the first surface, and wherein the first wedged prism is oriented with an apex side thereof away from the TDG.

5. The device of claim 4, wherein the second surface comprises the reflective surface.

6. The device of claim 3, further comprising a second wedged prism disposed between the spherical reflector and the wavelength dispersive reflector for refracting the sub-beams at angles of refraction that depend on temperature so as to further counteract temperature-induced variations of the second optical paths that occur outside of the wavelength dispersive reflector.

7. The device of claim 2, wherein the first wedged prism is disposed between the spherical mirror and the TDG.

8. The device of claim 5, wherein the first wedged prism is integral with the TDG.

9. The device of claim 2, further comprising an aberration correction prism of optically transparent material disposed in the second optical paths between the spherical mirror and the beam receiving elements.

10. The device of claim 1, wherein the array of beam receiving elements comprises an actuation array for selectively redirecting one or more of the sub-beams back to the spherical reflector for reflecting said one or more of the sub-beams therefrom back to the wavelength dispersive reflector for recombination into an output beam, whereupon the output beam is redirected by the spherical reflector to the front-end unit.

11. The device of claim 10, further comprising an aberration correction prism of optically transparent material disposed in the optical paths of the input and output beams between the spherical mirror and the actuation array.

12. The device of claim 11, wherein the first wedged prism compensates for a combined effect of a temperature dependence of dispersion properties of the TDG and a temperature dependence of refractive properties of the aberration correction prism.

13. The device of claim 10, wherein the actuation array comprises a micro-electro-mechanical system (MEMS) device having a plurality of reflectors movable about an axis parallel to the dispersion plane for receiving each sub-beam at a different reflector.

14. The device of claim 10, wherein the front-end unit includes:
a plurality of ports comprising the first port and output ports for receiving the output beam, and
a switching lens having an optical axis for converting an angular displacement of the output beam into a lateral displacement corresponding to a selected one of the output ports.

15. The device of claim 10, wherein the actuation array comprises a liquid crystal deflection array having a plurality of pixels, each of the pixels having an optical phase array acting as an electro writable diffraction grating.

16. The device of claim 1, wherein the array of beam receiving elements comprises photodetectors.

17. The device of claim 1, wherein the array of beam receiving elements comprises reflective LC cells for selectively modifying the sub-beams and for directing the modified sub-beams for coupling into the input port.

18. The device of claim 1, further comprising a heating or cooling element and a temperature sensor thermally coupled to the first wedged prism for maintaining a temperature difference between the first prism and the rest of the device.

* * * * *